United States Patent
Göbel et al.

(10) Patent No.: US 6,566,444 B1
(45) Date of Patent: May 20, 2003

(54) WATER-DILUTABLE BINDER AGENT COMPOSITION

(75) Inventors: Armin Göbel, Wetter (DE); Hermann Schaffer, Wuppertal (DE); Bettina Vogt-Birnbrich, Solingen (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/582,478

(22) PCT Filed: Sep. 24, 1999

(86) PCT No.: PCT/EP99/07108

§ 371 (c)(1),
(2), (4) Date: Sep. 27, 2001

(87) PCT Pub. No.: WO00/24797

PCT Pub. Date: May 4, 2000

(30) Foreign Application Priority Data

Oct. 26, 1998 (DE) .......................... 198 49 207

(51) Int. Cl.$^7$ .............. C08J 3/00; C08K 3/20; C08L 75/00; B32B 27/00; B32B 27/40

(52) U.S. Cl. ................... 524/589; 428/423.1; 524/590; 524/591; 524/839; 524/840

(58) Field of Search ................. 524/591, 839, 524/840, 589, 590; 428/423.1

(56) References Cited

U.S. PATENT DOCUMENTS 5,047,294 A * 9/1991 Schwab et al.

* cited by examiner

*Primary Examiner*—Patrick D. Niland
(74) *Attorney, Agent, or Firm*—Sudhir G. Deshmukh

(57) ABSTRACT

Water-dilutable binder composition containing one or more water-dilutable hydroxy-functional polyurethane urea paste resins having a urea group content (calculated as —NHCONH—) of from 10 to 300 mmol, a urethane group content (calculated as —NHCOO—) of from 20 to 300 mmol, in each case in 100 g of solid resin, an OH number of from 20 to 250, an acid number of from 15 to 80 and a molar mass Mn of from 1000 to 20,000, obtainable by I) preparing an NCO-group-containing polyurethane prepolymer by reacting
    a1) hydroxy-functional compounds having a molar mass (Mn) of from 360 to 8000 with
    a2) polyisocyanates and
    a3) compounds having at least one group that is able to react with isocyanates and at least one ionic group, II) subsequently reacting the polyurethane prepolymer with
    a4) hydroxy-functional monoamines and, optionally, polyols, and III) neutralising groups that can be converted into ionic groups, and from 2.0 to 25 wt. %, based on the solids content of polyurethane urea resin, of one or more polyether polyols having a molar mass of from 400 to 5000.

13 Claims, No Drawings

WATER-DILUTABLE BINDER AGENT COMPOSITION

The invention relates to water-dilutable binder compositions which can advantageously be used as a paste resin for the milling of pigments. The resulting pigment pastes are suitable for incorporation into aqueous coating compositions, especially for incorporation into water-based lacquers and water-based finishing lacquers. The water-dilutable binder compositions can be used in automotive and industrial lacquering for coating plastics and metal substrates.

In the preparation of stable pigmented water lacquers it is necessary to wet the pigments thoroughly, grind them finely in suitable dispersing units and disperse them stably in order to prevent agglomeration or sedimentation of the pigments. When low-solvent water-dilutable dispersions or emulsions are used, the action of the shearing forces may be inadequate owing to the very low viscosities. In addition, it must be taken into account that water-dilutable high molecular weight dispersions or emulsions are not always stable to shear in dispersing units. In those cases it is therefore necessary to replace a portion of the binder that is to be used by a paste resin in which the pigments are milled. The pigment or ground pastes so obtained are subsequently mixed ("lacquered up" or made up) with the main binder.

The mentioned paste resins must meet a number of requirements. For example, the paste binders are to be compatible with the main binder(s) and are not to impair the properties of the lacquer in the required added amount. They are to exhibit a good wetting ability for the pigments in question, are to be stable to storage over a prolonged period and are not to bring about colour changes in the lacquer. For the preparation of repair lacquers from standardised mixed lacquers in particular, it is very important to use lacquer concentrates which are highly reproducible in terms of colouristic and technological properties, in order to produce desired shades of colour economically and without unreasonable outlay in terms of shade.

Various binders which are suitable as a paste resin have already been described, which binders can be used in water-based lacquers or water-based finishing lacquers having various binder compositions. For example, in EP-A-0 260 447, polyester resins, acrylate resins and/or amine-formaldehyde condensation resins are used as the milling resin for the preparation of water-based lacquers. The water-based lacquers contain acrylated polyesters and polyurethane resins as the main binder. The milling resins described therein are not always fully compatible with the main binders, which can lead inter alia to an impairment of the metallic effect in the formulation of metallic lacquers.

EP-A-0 299 148 describes pigment pastes based on water-dilutable polyurethane paste resins, the polyurethane resins being prepared from polyester polyols, the acid component of which contains at least 50 wt. % long-chained carboxylic acids having from 18 to 60 carbon atoms in the molecule.

EP-A-438 090 describes milling resins based on water-dilutable polyester urethanes, which are obtained by reacting carboxyl-group-free polyester polyols and low molecular weight diols, at least some of the low molecular weight diols containing an acid group capable of anion formation, with diisocyanates.

A disadvantage of the mentioned milling pastes is that pigment pastes formulated therefrom, especially white pastes, produce lacquers having an inadequate covering power. It is also very difficult using the known paste formulations to produce a deep black. The formulated pigment pastes are often highly thixotropic, so that the metering ability and pumpability of the pastes are greatly impaired. Furthermore, both the known paste resins and the pigment pastes formulated therewith are not stable to frost, and the resistance to chemicals of the water lacquers prepared using those paste resins or of coatings obtained therefrom is in need of improvement. Occasionally, inadequate solids contents are achieved in the preparation of paste resin dispersions, which inter alia can impair the processability and render it less economical.

Furthermore, EP-A-0 469 389 discloses aqueous two-component polyurethane coating compositions which contain water-dilutable hydroxy-functional polyurethane resins having a total urethane and urea group content of from 9 to 20 wt. %, based on the weight of the polyurethane, and water-dispersible polyisocyanates. The coating compositions may additionally contain as a 3rd component up to 20 wt. % of a polyol having a molar mass of from 62 to 1000, preferably from 62 to 250, which may optionally contain polyether groups. The use of the mentioned polyurethane resins as a paste resin is not mentioned.

Accordingly, the object of the invention was to make available water-dilutable binder compositions which are suitable as a paste resin and which can be used as a pigment paste formulation for incorporation into aqueous coating compositions. Pigment pastes formulated from the binder compositions are to exhibit very good compatibility with a large number of different binder systems as well as a very good pigmenting and wetting ability, and consequently are to enable pigmented lacquers to be prepared in an energy- and time-saving manner. It is to be possible to process and meter, and especially also pump, the pigment pastes readily. The pigment pastes are to yield lacquers having a very good covering power and enable the production of a deep black. The pigment pastes and the aqueous lacquers prepared therefrom are also to be stable to storage and to frost. Coatings having a high gloss, a good metallic effect and also very good hardness and resistance to chemicals are to be obtained.

The object is achieved by a water-dilutable binder composition containing

A) one or more water-dilutable hydroxy-functional polyurethane urea resins having a urea group content (calculated as —NHCONH—) of from 10 to 300, preferably from 20 to 250, mmol in 100 g of solid resin, a urethane group content (calculated as —NHCOO—) of from 20 to 300, preferably from 80 to 250, mmol in 100 g of solid resin, an OH number of from 20 to 250, preferably from 40 to 200, especially from 60 to 150, an acid number of from 15 to 80, preferably from 18 to 65, especially from 19 to 45, and a number-average molar mass Mn of from 1000 to 20,000 g/mol, preferably from 1500 to 15,000 g/mol, which are obtained by
  I) preparing an NCO-group-containing polyurethane prepolymer by reacting
    a1) one or more hydroxy-functional compounds having a number-average molar mass Mn of from 360 to 8000 g/mol, preferably from 500 to 5000 g/mol, with
    a2) one or more polyisocyanates and
    a3) at least one compound having at least one group that is able to react with isocyanate and at least one group that is ionic or capable of ion formation,
  II) subsequently reacting the NCO-group-containing polyurethane prepolymer with
    a4) one or more hydroxy-functional monoamines and optionally with one or more polyols, in such relative amounts that the resulting polyurethane has the desired hydroxyl numbers and urea and urethane group contents, III) neutralising at least some of the ionic groups of the resulting polyurethane before or after the reaction in step II, and converting the resulting reaction product into the aqueous phase, and B) from 2.0 to 25 wt. %, based on the solids content of polyurethane urea resin used, of one or more polyether polyols having a molar mass of from 400 to 5000 g/mol, preferably from 500 to 3000 g/mol.

The binder composition according to the invention contains as component A) one or more water-dilutable hydroxy-functional polyurethane urea resins.

The water-dilutable hydroxy-functional polyurethane urea resins and their preparation will be described hereinbelow.

For the preparation of the water-dilutable polyurethane urea resins, an NCO-functional polyurethane prepolymer is first prepared in a first step (I). The polyurethane prepolymer is obtained by reacting components a1) to a3).

Component a1) for the preparation of the NCO-functional polyurethane prepolymer is hydroxy-functional linear or branched compounds which preferably have an OH-functionality of from 2 to 3, especially 2, an OH number of from 50 to 250 and a number-average molar mass (Mn) of from 360 to 8000 g/mol, preferably from 500 to 5000 g/mol.

There may be used as component a1) polyester polyols, polycarbonate polyols, polyether polyols, polylactone polyols and/or poly(meth)acrylate polyols and the corresponding diols. The polyols and diols may each be used individually or in combination with one another.

Polyester polyols, for example polyester diols, are preferably used as component a1). They are especially linear polyester polyols, especially linear polyester diols.

The polyester polyols can be prepared in a conventional manner known to the person skilled in the art, for example by polycondensation from organic dicarboxylic acids or their anhydrides and organic polyols. The dicarboxylic acids and the polyols may be of aliphatic, cycloaliphatic or aromatic nature.

The acid component for the preparation of the polyester polyols is preferably low molecular weight dicarboxylic acids or their anhydrides having from 2 to 17, preferably less than 16, especially less than 14, carbon atoms in the molecule. Suitable dicarboxylic acids are, for example, phthalic acid, isophthalic acid, alkylisophthalic acid, terephthalic acid, hexahydrophthalic acid, adipic acid, trimethyladipic acid, azelaic acid, sebacic acid, fumaric acid, maleic acid, glutaric acid, succinic acid, itaconic acid and 1,4-cyclohexanedicarboxylic acid. Instead of the acids, the corresponding anhydrides, where they exist, can also be used. In order to achieve branching, amounts of carboxylic acids having a higher functionality may also be added, for example trifunctional carboxylic acids such as trimellitic acid, malic acid and dimethylolpropionic acid.

Polyols which can be used for the preparation of the polyester polyols are preferably diols, for example glycols, such as ethylene glycol, 1,2-propanediol, 1,2-, 1,3- and 1,4-butanediol, 2-ethylene-1,3-propanediol, 1,6-hexanediol, 1,2- and 1,4-cyclohexanediol, hydrogenated bisphenol A and neopentyl glycol.

The diols may optionally be modified by small amounts of higher-hydric alcohols.

Examples of higher-hydric alcohols which can be used concomitantly are trimethylolpropane, pentaerythritol, glycerol and hexanetriol. Chain-terminating monohydric alcohols, for example those having from 1 to 18 carbon atoms in the molecule, such as propanol, butanol, cyclohexanol, n-hexanol, benzyl alcohol, isodecanol, saturated and unsaturated fatty alcohols, can also be used proportionately.

The components are reacted in such relative amounts that the desired OH numbers of the polyester polyols are obtained.

The polyester polyols are preferably substantially free of carboxyl groups. They may have, for example, acid numbers of <3, preferably <1. It is, however, also possible for the polyester polyols to contain carboxyl groups; for example, they may then have acid numbers of from 5 to 50 mg of KOH/g. The carboxyl groups may be introduced, for example, via di- or tri-functional carboxylic acids, such as, for example, trimellitic acid, malic acid, and dihydroxy-monocarboxylic acids, such as, for example, dimethylolpropionic acid.

The polyester polyols may be used individually or in combination with one another.

Also preferred as component a1) are polycarbonate polyols and especially polycarbonate diols.

The polycarbonate polyols are esters of carbonic acid, which are obtained by reacting carbonic acid derivatives, for example diphenyl carbonate or phosgene, with polyols, preferably diols. Suitable diols are, for example, ethylene glycol, 1,2- and 1,3-propanediol, 1,4- and 1,3-butanediol, 1,6-hexanediol, neopentyl glycol, 2-methyl-1,3-propanediol and 1,4-bishydroxymethylcyclohexane.

The polycarbonate polyols may be used individually or in combination with one another.

Also suitable as component a1) are polyether polyols and/or polylactone polyols.

Suitable polyether polyols are, for example, polyether polyols having the following general formula:

in which $R^4$ represents hydrogen or a lower alkyl radical (for example $C_1$ to $C_6$), optionally having various substituents, n=from 2 to 6 and m=from 10 to 50. The radicals $R^4$ may be identical or different. Examples of polyether polyols are poly(oxytetramethylene) glycols, poly(oxyethylene) glycols and poly(oxypropylene) glycols or mixed block copolymers which contain different oxytetramethylene, oxyethylene and/or oxypropylene units.

The polyether polyols may be used individually or in combination with one another.

The polylactone polyols are polyols, preferably diols, which are derived from lactones, preferably caprolactones. Those products are obtained, for example, by reacting an epsilon-caprolactone with a diol. The polylactone polyols are distinguished by repeating polyester components, which are derived from the lactone. Those repeating molecule components may correspond, for example, to the following general formula:

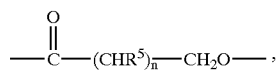

wherein n is preferably from 4 to 6 and $R^5$ is hydrogen, an alkyl radical, a cycloalkyl radical or an alkoxy radical, and the total number of carbon atoms in the substituents of the lactone ring does not exceed 12. Lactones that are preferably used are the epsilon-caprolactones in which n has the value 4. Special preference is given to the unsubstituted epsilon-caprolactone. The lactones may be used individually or in combination.

Diols suitable for the reaction with the lactones are, for example, ethylene glycol, 1,3-propanediol, 1,4-butanediol and dimethylolcyclohexane.

The polylactone polyols may be used individually or in combination with one another.

Poly(meth)acrylate polyols may also be used as component a1). The poly(meth)acrylate polyols are polymers of hydroxy-functional (meth)acrylic acid esters and further radically polymerisable unsaturated monomers prepared by means of free-radical polymerisation. There may preferably be used poly(meth)acrylate polyols which, owing to the specific preparation process, have a selective structure with terminal OH groups. The poly(meth)acrylate polyols may likewise be used individually or in combination with one another.

There may additionally be used in component a1) optionally one or more low molecular weight polyhydric alcohols, preferably difunctional alcohols, having a molar mass of from 62 to 356 g/mol. Examples thereof are ethylene glycol, 1,2- and 1,3-propanediol, 1,3- and 1,4-butanediol, 1,6-hexanediol, 1,8-octanediol, 1,2- and 1,4-cyclohexanediol, dimethylolpropane, neopentyl glycol, cyclohexanedimethanol and hydroxyethylated or hydroxypropylated bisphenol A or bisphenol F.

There may be used as component a2) for the preparation of the NCO-functional prepolymers any organic polyisocyanates, preferably diisocyanates, individually or in combination. The polyisocyanates may be, for example, of aromatic, aliphatic and/or cycloaliphatic nature. They may also be diisocyanates containing ether or ester groups. Examples of suitable diisocyanates are trimethylene diisocyanate, tetramethylene diisocyanate, pentamethylene diisocyanate, hexamethylene diisocyanate, propylene diisocyanate, ethylene diisocyanate, 2,3-dimethylethylene diisocyanate, 1-methyltrimethylene diisocyanate, 1,3-cyclopentylene diisocyanate, 1,4-cyclohexylene diisocyanate, 1,2-cyclohexylene diisocyanate, 1,3-phenylene diisocyanate, 1,4-phenylene diisocyanate, 2,4-toluylene diisocyanate, 2,6-toluylene diisocyanate, 1-isocyanatomethyl-5-isocyanato-1,3,3-trimethylcyclohexane, bis-(4-isocyanato-phenyl)-methane, norbornene diisocyanate, 4,4-diisocyanato-diphenyl ether, 1,5-dibutylpentamethylene diisocyanate, 2,3-bis-(8-isocyanatooctyl)-4-octyl-5-hexylcyclohexane, 3-isocyanatomethyl-1-methylcyclohexyl isocyanate and/or 2,6-diisocyanatomethyl capronate.

It is also possible to use non-yellowing and/or sterically hindered isocyanates which have from 4 to 25, preferably from 6 to 16, carbon atoms and contain as substituent on the basic structure, in the alpha-position with respect to the NCO group, one or two linear, branched or cyclic alkyl groups having from 1 to 12, preferably from 1 to 4, carbon atoms. The basic structure may consist of an aromatic or alicyclic ring or of an aliphatic linear or branched carbon chain having from 1 to 12 carbon atoms. Examples thereof are isophorone diisocyanate, bis-(4-isocyanatocyclohexyl) methane, 1,1,6,6-tetramethyl-hexamethylene diisocyanate, 1,5-dibutyl-pentamethylene diisocyanate, 3-isocyanatomethyl-1-methyl-cyclohexyl isocyanate, p- and m-tetramethylxylylene diisocyanate and/or the corresponding hydrogenated homologues.

Component a3) for the preparation of the NCO-functional prepolymer is preferably low molecular weight compounds which have at least one, preferably more than one, especially two, groups that are able to react with isocyanate groups and at least one group that is ionic or capable of ion formation. Carboxyl, phosphoric acid and sulfonic acid groups, for example, come into consideration as groups capable of anion formation. Preferred anionic groups are carboxyl groups. There come into consideration as groups capable of cation formation, for example, primary, secondary and tertiary amino groups or onium groups, such as quaternary ammonium, phosphonium and/or tertiary sulfonium groups. Groups that are anionic or capable of anion formation are preferred. Suitable groups that are able to react with isocyanate are especially hydroxyl groups as well as primary and/or secondary amino groups.

Preferred compounds that are suitable as component a3) are those which contain carboxyl and hydroxyl groups. Examples of such compounds are hydroxyalkanecarboxylic acids of the following general formula:

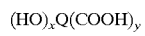

$(HO)_x Q(COOH)_y$ wherein

Q represents a straight or branched hydrocarbon radical having from 1 to 12 carbon atoms and x and y each represent from 1 to 3. Examples thereof are citric acid and tartaric acid. Preference is given to carboxylic acids wherein x=2 and y=1.

A preferred group of dihydroxyalkanoic acids is alpha,alpha-dimethylolalkanoic acids.

Preference is given to alpha,alpha-dimethylolpropionic acid and alpha,alpha-dimethylolbutyric acid.

Further examples of dihydroxyalkanoic acids that can be used are dihydroxypropionic acid, dimethylolacetic acid, dihydroxysuccinic acid or dihydroxybenzoic acid.

Further compounds that can be used as component a3) are amino-group-containing acids, for example alpha,alpha-diamino-valeric acid, 3,4-diaminobenzoic acid, 2,4-diamino-toluene-sulfonic acid and 4,4-diamino-diphenyl ether sulfonic acid, as well as dihydroxy compounds which contain a tertiary and/or quaternary amino group, such as, for example, N-methyldiethanolamine, N-methyl diisocyanate and 2-N,N-dimethylamino-2-ethyl-1,3-propanediol.

The reaction of components a1), a2) and a3) together is carried out in a conventional manner known to the person skilled in the art, for example at temperatures of from 50 to 120° C., preferably from 70 to 100° C., optionally with the addition of catalysts.

Components a1), a2) and a3) are reacted in such amounts that a reaction product having free isocyanate groups is formed, that is to say an excess of polyisocyanate is used. For example, a ratio of equivalents of NCO groups:OH groups of from 1.1:1 to 2.0:1, preferably from 1.2:1 to 1.9:1, can be used.

The NCO-group-containing polyurethane prepolymer obtained in step I is then reacted in a further step II) with component a4) and thus converted into a urea-group-containing and hydroxy-functional polyurethane. Component a4) is one or more hydroxy-functional monoamines each having a primary or secondary amino group. The hydroxy-functional monoamines may optionally be used together with one or more polyols. The reaction is carried out with complete consumption of the amino groups. The monoamines that can be used may contain one or preferably more than one hydroxyl group. They may be, for example, alkanolamines, dialkanolamines, alkylalkanolamines and/or arylalkanolamines having at least 2 and not more than 18 carbon atoms in the alkanol, alkyl and aryl radical. Examples of monoamines having one hydroxyl group that can be used are monoethanolamine, N-methylethanolamine, 3-amino-1-propanol, 2-amino-2-methylpropanol, N-phenylmethanolamine and N-cyclohexylethanolamine. Examples of monoamines having two or more hydroxyl groups are diethanolamine, diisopropanolamine, 2-amino-2-ethyl-1,3-propanediol and 2-amino-2-hydroxymethylpropane-1,3-diol.

The hydroxyamines and the polyols that are optionally present (component a4) are used in such an amount that OH numbers of from 20 to 250, preferably from 40 to 200, especially from 60 to 150, and urea group contents of from 10 to 300, preferably from 20 to 250, mmol in 100 g of solid resin are achieved in the resulting reaction product. Complete conversion is desired with a virtually equivalent molar ratio between the reactive amino group and the isocyanate group. Optionally, a very small NCO excess can be used. The ratio of equivalents of NCO groups to amino groups is to be less than 1.05:1, but it is preferably 1:1.

The polyols which are optionally present together with the hydroxyamines can serve to introduce hydroxyl groups into the polyurethane. They are preferably low molecular weight alcohols having two or more hydroxyl groups. Examples thereof are neopentyl glycol, trimethylolpropane, pentaerythritol, dipentaerythritol and glycerol, hydroxypivalic acid neopentyl glycol ester, 2-ethyl-2-methyl-1,3-propanediol, 1,6-hexanediol, cyclohexanedimethanol and ditrimethylolpropane.

It is, however, also possible to introduce an amount of cationic groups into the polyurethane urea resin in addition to the anionic groups. In terms of equivalents, the cationic groups are to be present only as a fraction, based on the anionic groups. The cationic groups are preferably tertiary and/or quaternary amino groups. For example, from 0.05 to 25%, preferably from 0.1 to 10%, of cationic groups, based on equivalents of anionic groups, may be present. The introduction of additional cationic groups can be effected, for example, by reacting the NCO prepolymer with compounds having at least one hydroxyl group and one tertiary or quaternary amino group. The procedure may, for example, be such that the mentioned compounds having tertiary and/or quaternary amino groups are reacted with the NCO prepolymer together with the amino alcohols. Examples of compounds having at least one hydroxyl group and one tertiary or quaternary amino group are N-methyldiethanolamine, N-methyl-diisopropanol and 2-N,N-dimethylamino-2-ethyl-1,3-propanediol.

In order to achieve adequate water dilutability, at least some of the groups in the polyurethane urea resin that are ionic or can be converted into ionic groups are neutralised in a further step III. The neutralisation may take place either before or after the reaction with the hydroxyamines. The polyurethane resins preferably contain anionic groups. The anionic groups are neutralised using bases. Preferred examples of basic neutralising agents are tertiary amines, such as trimethylamine, triethylamine, dimethylethylamine, dimethylbutylamine, N-methylmorpholine, dimethylethanolamine and dimethylisopropanolamine. Isocyanate-group-free polyurethane urea resins can also be neutralised using amines containing groups that are able to react with isocyanate groups, for example using primary or secondary amines or amino alcohols.

After the neutralisation, the polyurethane urea resin is converted into the aqueous phase. Neutralisation and conversion into the aqueous phase may also be carried out simultaneously, however.

The polyurethane urea resin is in a colloidal state in the aqueous phase and exhibits intrinsically viscous behaviour. That means that the viscosity falls as the shear rate increases. The viscosity of the polyurethane urea dispersion, measured at a shear rate of 231 s$^{-1}$ and a solids content of 35 wt. %, is from 0.5 to 10 Pas. The degree of neutralisation is preferably from 60 to 120%, especially from 70 to 100%. The aqueous resin dispersion has a solids content of preferably from 25 to 50 wt. %, especially from 28 to 42 wt. %.

The particle size of the polyurethane urea resin in the aqueous phase is preferably in the range of from 25 to 200 nm, preferably from 30 to 100 nm.

The aqueous polyurethane urea dispersion may preferably have, for example, the following composition:

| | |
|---|---|
| from 20 to 50 parts by weight | of the polyurethane urea resin |
| from 0.3 to 18 parts by weight | of neutralising agent, preferably ammonia and/or amine |
| from 4 to 25 parts by weight | of one or more at least partially water-miscible organic solvents and |
| from 15 to 75 parts by weight | of water. |

The binder composition according to the invention contains as component B) from 2.0 to 25 wt. %, based on the solids content of the polyurethane urea resin used, of one or more polyether polyols having a molar mass of from 400 to 5000, preferably from 500 to 3000, g/mol.

Examples of suitable polyether polyols are poly(oxytetramethylene) glycols, poly(oxyethylene) glycols and poly(oxypropylene) glycols or mixed block copolymers which contain different oxytetramethylene, oxyethylene and/or oxypropylene units. Preference is given to polyether polyols that are obtained without the concomitant use of ethylene oxide, that is to say especially using only propylene oxide or tetrahydrofuran. Special preference is given to the use of polyoxypropylene glycols having molar masses of from 500 to 3000 g/mol. Different polyether polyols can be combined with one another.

The binder composition according to the invention can be prepared by mixing components A) and B). That can be effected in various ways. For example, it is possible to add the polyether polyols (component B) to the water-dilutable polyurethane resin (component A) before, during or after formation of the emulsion, that is to say before, during or after the conversion of the water-dilutable polyurethane resin into the aqueous phase. The procedure can preferably be carried out in such a manner that the polyether polyols (component B) are added to the water-dilutable polyurethane resin (component A) before it is converted into the aqueous phase. If the polyether polyols are added before the conversion into the aqueous phase, it is also possible to add the polyether polyols to the NCO prepolymer together with the hydroxy-functional monoamines. The reaction conditions for the reaction of the NCO prepolymer with the hydroxy-functional monoamines are chosen in a manner known to the person skilled in the art so that the NCO groups react only with the amino groups.

The above-described water-dilutable polyurethane resins (component A) may optionally be used in combination with amounts of further water-dilutable OH-functional resins. There are suitable as further water-dilutable OH-functional resins, for example, conventional water-dilutable OH-functional (meth)acrylic copolymers, polyester resins, and optionally modified polyurethane resins other than the above-described water-dilutable polyurethane resins. The further water-dilutable OH-functional resins can be formulated as a binder composition together with the water-dilutable polyurethane resins (component A) and with component B) by mixing. However, they may also be added separately to the binder composition of component A) and component B).

Pigment pastes can advantageously be prepared from the binder composition according to the invention. Suitable pigments for the preparation of the pigment pastes are virtually all colouring and/or effect pigments. Suitable colouring pigments are all pigments of organic or inorganic nature customary in lacquers. Examples of inorganic or organic colouring pigments are titanium dioxide, micronised titanium dioxide, iron oxide pigments, carbon black, azo pigments, phthalocyanine pigments, quinacridone or pyrrolopyrrole pigments. Examples of effect pigments are metal pigments, for example of aluminium, copper or other metals; interference pigments, such as, for example, metal-oxide-coated metal pigments, for example titanium-dioxide-coated or mixed-oxide-coated aluminium, coated mica, such as, for example, titanium-dioxide-coated mica, and graphite effect pigments.

The pigment pastes prepared from the binder composition according to the invention may also contain water and small amounts of organic solvents as well as additives customary in lacquers.

The organic solvents optionally present in the pigment paste are solvents conventionally employed in lacquer technology. They may come from the preparation of the paste binder or are added separately. They are preferably water-miscible solvents. Examples of suitable solvents are mono- or poly-hydric alcohols, for example propanol, butanol, hexanol; glycol ethers or esters, for example diethylene glycol dialkyl ethers, dipropylene glycol dialkyl ethers, in each case with $C_1$- to $C_6$-alkyl, ethoxypropanol, butoxyethanol, glycols, for example ethylene glycol, propylene glycol, N-methylpyrrolidone as well as ketones, for example methyl ethyl ketone, acetone, cyclohexanone. The solvents may contain amounts of aromatic or aliphatic hydrocarbons, such as, for example, toluene, xylene or linear or branched aliphatic $C_6$–$C_{12}$-hydrocarbons. The organic solvents are present in an amount of up to, for example, a maximum of 10 to 15 wt. %, based on the total pigment paste.

Various lacquer additives may be incorporated into the pigment pastes prepared from the binder composition according to the invention. The additives are conventional additives which can be used in the lacquers sector and are known to the person skilled in the art. Examples of additives which may advantageously already be contained in the pigment paste are dispersing agents, wetting agents, antifoams, catalysts and substances for adjusting the pH value.

The ratio by weight of pigment to binder in the pigment paste can vary within relatively wide limits. It may be, for example, from 0.3:1 to 20:1, preferably from 0.5:1 to 15:1. The pigment:binder ratio to be set is dependent, for example, on the nature and particle size of the pigments used. In the case of formulations containing finely divided transparent pigments and containing carbon black, a pigment:binder ratio of from 0.8:1 to 2.0:1 can be used, for example, and in the case of formulations containing coarsely divided opacifying pigments, for example containing titanium dioxide, a pigment:binder ratio of from 4:1 to 8:1 can be used. In formulations containing metal effect pigments, for example aluminium pigments, a pigment:binder ratio of from 1.5:1 to 2.5:1 can be set, for example.

The pigment pastes containing the binder compositions according to the invention can be prepared in a conventional manner. For example, the individual constituents of the pigment paste can be mixed together and then ground in known dispersing units, for example in stirrer disk devices, three-roller mills, ball mills, sand or bead mills. That procedure is employed especially when colouring pigments are used. Units, dispersing times and other dispersing conditions depend essentially on the pigments used. If pigment pastes containing effect pigments, for example aluminium pigments or interference pigments, are to be prepared, then it is sufficient simply to stir or mix the pigments with the paste binder and optionally the further constituents of the pigment paste. Solids contents in the pigment paste of, for example, from 25 to 85 wt. % are obtained, depending on the pigment used.

The pigment paste can preferably contain, for example, from 5 to 90 parts by weight of pigment and from 10 to 95 parts by weight of the aqueous binder composition according to the invention. In addition, there may preferably be added, for example, from 0 to 40 parts by weight of water, from 0 to 10 parts by weight of organic solvents, from 0 to 5 parts by weight of neutralising agent and from 0 to 5 parts by weight of auxiliary substances. The above-mentioned parts by weight are to add up to 100 parts by weight.

It is also possible to combine the binder compositions according to the invention with amounts of further paste resins, which may likewise be OH-functional, in the pigment paste. The further paste resins which can optionally be used may be, for example, melamine resins, polyester resins, poly(meth)acrylates and/or optionally modified polyurethane resins other than the binder compositions according to the invention.

The invention relates also to aqueous coating compositions which contain the binder compositions according to the invention. The aqueous coating compositions may contain the binder compositions according to the invention as paste resin in the form of a pigment paste. It is, however, also possible for the aqueous coating compositions to contain the binder compositions according to the invention as paste resin and/or as the main binder (lacquering-up binder).

For the preparation of the aqueous coating compositions, the pigment pastes containing the binder compositions according to the invention are made up or lacquered up with a further binder, the actual main binder. There are suitable as lacquering-up binders all water-dilutable binders which are compatible with the paste resin and which are conventionally used for the preparation of water-based lacquers and water-based finishing lacquers for automotive and industrial lacquering. Examples of water-dilutable resins which can be used are polyurethane resins, polyester urethane resins, fatty-acid-modified polyester urethane resins, acrylated polyurethane resins and/or acrylated polyester resins, as well as poly(meth)acrylate resins. The lacquering-up binders may be used individually or in combination. Polyurethane resins and modified polyurethane resins are preferably used. Special preference is given to the use of mixtures of different polyurethane resins. It is, however, also possible to use the polyurethane resins in combination with other water-dilutable resins, for example with water-dilutable polyacrylate and/or polyester resins. Suitable polyurethane resins and suitable mixtures of polyurethane resins are described, for example, in DE-A-43 39 085, DE-A-39 36 794, DE-A-43 44 063, DE-A-41 15 042, DE-A-41 15 015, DE-A-43 23 896, DE-A-41 22 265, DE-A-42 28 510, DE-A-196 43 802, EP-A-089 497, EP-A-297 576.

It is also possible to use the binder composition according to the invention as the lacquering-up binder.

The aqueous coating compositions prepared with the binder compositions according to the invention may optionally also contain crosslinking agents. The crosslinking agents may be, for example, formaldehyde condensation resins, such as phenol-formaldehyde and amine-formaldehyde condensation resins, as well as blocked and unblocked polyisocyanates. Amine resins suitable as crosslinking agents are, for example, alkylated condensates which are prepared by reaction of aminotriazines and amidotriazines with aldehydes. To that end, amines or amino-group-carrying compounds, such as melamine, guanamine, benzoguanamine or urea, are condensed according to known processes with aldehydes, especially formaldehyde, in the presence of alcohols, such as methanol, ethanol, propanol, butanol or hexanol.

Polyisocyanates suitable as crosslinking agents are, for example, any organic polyisocyanates having aliphatically, cycloaliphatically, araliphatically and/or aromatically bonded free isocyanate groups. They are liquid at room temperature or liquefied by the addition of organic solvents. The polyisocyanates generally have a viscosity at 23° C. of from 1 to 6000 mPas, preferably greater than 5 and less than 3000 mPas. Such polyisocyanates are generally known and are described, for example, in DE-A 38 29 587 or DE-A 42 26 243.

The polyisocyanates are preferably polyisocyanates or polyisocyanate mixtures having solely aliphatically and/or cycloaliphatically bonded isocyanate groups having a mean NCO functionality of from 1.5 to 5, preferably from 2 to 3.

Especially suitable, for example, are "lacquer polyisocyanates" based on hexamethylene diisocyanate, 1-isocyanato-3,3,5-trimethyl-5-isocyanatomethyl-cyclohexane (IPDI) and/or bis(isocyanatocyclohexyl)-methane and the derivatives, known per se, of those diisocyanates containing biuret, allophanate, urethane and/or isocyanurate groups. Triisocyanates, such as nonane triisocyanate, may also be used. Sterically hindered polyisocyanates are also highly suitable. Examples thereof are 1,1,6,6-tetramethyl-hexamethylene diisocyanate, 1,5-dibutyl-pentamethyl diisocyanate, p- or m-tetramethylxylylene diisocyanate and the corresponding hydrogenated homologues. Those diisocyanates can also be converted in a suitable manner into compounds having a higher functionality, for example by trimerisation or by reaction with water or trimethylolpropane.

Blocked polyisocyanates may also be used as crosslinking agents. They are, for example, the polyisocyanates already mentioned above, which have been blocked with conventional volatile monovalent blocking agents. There are used as blocking agents, for example, alkyl monoalcohols, phenols, oximes, amines, phthalimide or beta-keto compounds.

However, further crosslinking agents known in the lacquers industry can also be used, providing the appropriate reactive groups are available in the binders that are used.

The crosslinking agents may be used individually or in admixture.

They are the crosslinking agents customary in the lacquers industry, which are comprehensively described in the literature and are obtainable as commercial products.

If crosslinking agents are to be used in the coating compositions, the choice of crosslinking agents is dependent on the crosslinkable functional groups in the lacquering-up binder(s) and/or in the paste binder. Especially advantageous binder systems are those containing crosslinking agents that react with hydroxyl groups, since the paste binder with its hydroxyl groups can then be included in the crosslinking reaction. It is not absolutely necessary for the lacquering-up binder also to contain crosslinkable functional groups. The lacquering-up binders may also be, for example, physically drying binders, so that a crosslinking reaction takes place only between the paste resin and the crosslinking agent.

The aqueous coating compositions prepared with the binder compositions according to the invention may also contain water, small amounts of organic solvents, and additives customary in lacquers. Examples of additives customary in lacquers are flow agents, agents affecting rheology, such as highly disperse silica or polymeric urea compounds, thickeners, such as crosslinked polycarboxylic acid or polyurethanes, antifoams, wetting agents, anti-pitting agents and hardening accelerators. The additives are used in conventional amounts known to the person skilled in the art. The aqueous coating compositions may also contain crosslinked polymer microparticles.

There may be added to the aqueous coating compositions effect pigments, such as, for example, the aluminium and/or interference pigments mentioned above, also in a conventional manner, for example in the form of a solvent paste, and not as a pigment paste containing paste resin.

Amounts of organic solvents may be present in the coating compositions, preferably not more than 20 wt. %, especially not more than 15 wt. %. The organic solvents are preferably water-miscible. They are conventional solvents customary in lacquering technology. They may come from the preparation of the binders or are added separately. Examples of such solvents are the solvents already mentioned above which can be used for the preparation of the pigment pastes.

For the preparation of the coating compositions, the pigment paste and/or the lacquering-up binder(s) and the further constituents are thoroughly mixed together and homogenised in a conventional manner. Owing to the good wetting properties of the paste binder, lacquering up takes place while the state of dispersion is maintained, that is to say flocculation of the pigments is prevented.

If lacquers containing both colouring and effect pigments are to be prepared, it is advantageous to prepare pigment pastes containing the colouring pigments and pigment pastes containing the effect pigments separately and then combine the two pigment pastes during formulation of the lacquer.

The coating compositions containing the binder compositions according to the invention can be formulated on the basis of physically drying or chemically crosslinking binders. If, for example, they are two-component coating compositions, the binder components that react together must be stored separately and cannot be mixed together until shortly before application.

In general, the coating compositions can, if required, be adjusted to the spraying viscosity before application, using water or organic solvents.

The hardening conditions are dependent on the choice of binders and the possible crosslinking agents. With appropriate selection of the crosslinking agents, for example in the case of polyisocyanate crosslinking agents, the coating compositions do not require baking and can be hardened at room temperature or forced at higher temperatures, for example up to 80° C., preferably up to 60° C. However, it is also possible to harden them at higher temperatures of, for example, from 80 to 150° C., for example when they contain melamine resins and/or blocked polyisocyanates.

The aqueous coating compositions containing the binder compositions according to the invention are especially suitable for the preparation of colouring and/or effect base layers as well as pigmented finishing lacquer layers in the case of multi-layer lacquering. The preferred field of application is the lacquering of motor vehicles and motor vehicle parts. The binder compositions according to the invention and the coating compositions containing them can be used, according to the hardening conditions, both for vehicle repair lacquering (hardening temperatures of, for example, from 20 to 80° C.) and for the series lacquering of motor vehicles (hardening temperatures of, for example, from 100 to 140° C.).

Other industrial applications are also possible, however.

Accordingly, the invention relates also to the use of the coating compositions containing the binder compositions according to the invention in a process for multi-layer lacquering, in which a filler layer is applied to an optionally pre-coated substrate, for example to a substrate pre-coated with a primer, and a finishing lacquer layer is applied to the filler layer, wherein the finishing lacquer layer can be applied in the form of a pigmented single-layer finishing lacquer or in the form of a colouring and/or effect base lacquer layer and a clear lacquer layer applied thereto, and wherein the single-layer finishing lacquer and the base lacquer contain the binder compositions according to the invention. The clear lacquer can be applied to the base lacquer either after drying or hardening or wet-in-wet, optionally after exposure to air for a short time. Suitable clear lacquers are in principle all known unpigmented or transparently pigmented coating compositions, such as are customary, for example, in the lacquering of motor vehicles. They may be solvent- or water-based single- or two-component clear lacquers or powdered clear lacquers.

The coating compositions are applied by conventional methods, preferably by means of spray application.

Suitable substrates are metal and plastics substrates, especially the substrates known in the automotive industry, such as, for example, iron, zinc, aluminium, magnesium, stainless steel or alloys thereof, as well as polyurethanes, polycarbonates or polyolefins.

Pigment pastes and/or water lacquers prepared from the binder compositions according to the invention are stable to frost and storage. They exhibit no settling of the pigments even after prolonged storage. High-gloss coatings having a high degree of resistance to chemicals and very good hardness are obtained. If pigment pastes containing metal pigments, especially aluminium pigments, are prepared and incorporated into corresponding coating compositions, the coating compositions have a considerably lower solvent content than metal effect lacquers prepared in the conventional manner using a solvent paste of the aluminium pigments. The coatings exhibit a very good metallic effect. In contrast to high molecular weight dispersions or emulsions, the binder compositions according to the invention are stable to shear, so that they are especially suitable for the milling of pigments. On account of their very good wettability, especially highly concentrated pigment pastes can be prepared.

Pigment pastes prepared from the binder compositions according to the invention, especially white pigmented pastes, produce coating compositions having a very good covering power. With the paste binders according to the invention, a deep black can also be formulated as a shade of colour.

The invention is to be explained in greater detail with reference to the examples which follow.

EXAMPLE 1

Preparation of a Polyurethane Urea Dispersion

Items 1 to 3 are each weighed into a 2 litre flask having a stirrer and a thermometer, heated to 80° C. under a protective gas and maintained at that temperature until the dimethylolpropionic acid has dissolved completely. The mixture is cooled to 50° C., item 4 is added, and the whole is heated to 80° C. again. The batch is maintained at 80° C. until the isocyanate number (based on solution) is from 4.2 to 4.5%. The mixture is then cooled to approximately 40° C. and items 5 and 6 are together added (exothermic reaction). After one hour at 80° C., the isocyanate number is less than 0.1%. Item 7 is then added at 80° C. After 15 minutes, the mixture is diluted with item 8, adjusted to a solids content of approximately 35% and stirred homogeneously for one hour at 50° C. The items for four polyurethane dispersions are given below.

dem. water: demineralised or deionised water prepared by distillation or with the aid of ion exchangers.

Polyurethane Dispersion 1:
1. 17.21 parts by weight of commercial aliphatic linear polyesters having an OH number of 106
2. 2.25 parts by weight of dimethylolpropionic acid
3. 6.14 parts by weight of N-methylpyrrolidone
4. 11.50 parts by weight of isophorone diisocyanate
5. 2.29 parts by weight of monoethanolamine
6. 1.75 parts by weight of polypropylene glycol having a molar mass of approximately 900
7. 2.13 parts by weight of a 1:1 mixture of dimethylethanolamine and dem. water
8. 56.73 parts by weight of dem. water (demineralised water)

Final values:

Solids (30 min., 150° C.): 35% in N-methylpyrrolidone/butoxyethanol/dem. water

Acid number: 28

MEQ(amine): 34.0 (milliequivalents of amine, based on 100 g of solid resin)

Degree of neutralisation: approximately 70%

OH number: 66

Viscosity (measured at 25° C. using a rotary measuring device at a shear rate of 231 $s^{-1}$: 1.405 Pas Urea group content: 107 mmol in 100 g of solid resin Urethane group content: 189 mmol in 100 g of solid resin Polyurethane Dispersion 2:
1. 16.96 parts by weight of commercial polycarbonate diol having an OH number of 115 mg of KOH/g
2. 2.29 parts by weight of dimethylolpropionic acid
3. 6.15 parts by weight of N-methylpyrrolidone
4. 11.74 parts by weight of isophorone diisocyanate
5. 2.26 parts by weight of monoethanolamine
6. 1.75 parts by weight of polypropylene glycol having a molar mass of approximately 900
7. 2.28 parts by weight of a 1:1 mixture of dimethylethanolamine and dem. water
8. 56.57 parts by weight of dem. water Final values:

Solids (30 min., 150° C.): 35% in N-methylpyrrolidone/butoxyethanol/dem. water

Acid number: 28.0

MEQ(amine): 37

Degree of neutralisation: approximately 75%

OH number: 65

Viscosity (measured at 25° C. using a rotary measuring device at a shear rate of 231 $s^{-1}$: 1.60 Pas Urea group content: 106 mmol in 100 g of solid resin Urethane group content: 196 mmol in 100 g of solid resin Polyurethane Dispersion 3:
1. 15.70 parts by weight of commercial aliphatic linear polyesters having an OH number of 106
2. 2.05 parts by weight of dimethylolpropionic acid 3. 5.59 parts by weight of N-methylpyrrolidone
4. 10.48 parts by weight of isophorone diisocyanate
5. 3.59 parts by weight of diethanolamine
6. 3.18 parts by weight of polypropylene glycol having a molar mass of approximately 900
7. 2.03 parts by weight of a 1:1 mixture of dimethylethanolamine and dem. water
8. 57.38 parts by weight of dem. water Final values:

Solids (30 min., 150° C.): 35% in N-methylpyrrolidone/butoxyethanol/dem. water

Acid number: 25.0

MEQ(amine): 33

Degree of neutralisation: approximately 74%

OH number: 120

Viscosity (measured at 25° C. using a rotary measuring device at a shear rate of 231 s$^{-1}$: 0.905 Pas Urea group content: 98 mmol in 100 g of solid resin Urethane group content: 172 mmol in 100 g of solid resin Polyurethane dispersion 4:
1. 16.44 parts by weight of commercial aliphatic linear polyesters having an OH number of 106
2. 2.15 parts by weight of dimethylolpropionic acid
3. 5.86 parts by weight of N-methylpyrrolidone
4. 10.98 parts by weight of isophorone diisocyanate
5. 3.76 parts by weight of diethanolamine
6. 1.67 parts by weight of polypropylene glycol having a molar mass of approximately 900
7. 2.03 parts by weight of a 1:1 mixture of dimethylethanolamine and dem. water
8. 57.11 parts by weight of dem. water Final values:

Solids (30 min., 150° C.): 35% in N-methylpyrrolidone/butoxyethanol/dem. water

Acid number: 26.1

MEQ(amine): 31.1

Degree of neutralisation: approximately 67%

OH number: 120

Viscosity (measured at 25° C. using a rotary measuring device at a shear rate of 231 s$^{-1}$: 1.116 Pas Urea group content: 102 mmol in 100 g of solid resin Urethane group content: 181 mmol in 100 g of solid resin

EXAMPLE 2

Preparation of Pigment Pastes 2.1. Preparation of a Black Paste

The following constituents are mixed together and dispersed in a bead mill:
- 41.0 wt. % of polyurethane dispersion 1
- 16.0 wt. % of carbon black
- 29.5 wt. % of dem. water
- 4.0 wt. % of a commercial ionic wetting agent
- 0.5 wt. % of silicone antifoam 2.2. Preparation of a White Paste The following constituents are mixed together and dispersed in a dissolver:
- 26.0 wt. % of polyurethane dispersion 2
- 68.0 wt. % of titanium dioxide
- 2.0 wt. % of dem. water
- 2.0 wt. % of butoxyethanol
- 1.0 wt. % of a 10% dimethylethanolamine solution
- 1.0 wt. % of anionic wetting agent 2.3. Preparation of a Bronze Paste The following constituents are mixed together thoroughly, with stirring:
- 49.0 wt. % of polyurethane dispersion 3
- 46.0 wt. % of a commercial 65% bronze paste
- 5.0 wt. % of n-butanol 2.4. Preparation of an Iriodine Paste 60.0 wt. % of polyurethane dispersion 4 and 40.0 wt. % of a commercial iriodine pigment are mixed together thoroughly, with stirring.

The pigment pastes so prepared are each readily processable. They are stable to storage and exhibit no settling of the pigments even after a storage time of 12 months. The pigment pastes are stable to frost. In order to test their stability to frost, the pastes were frozen at −5° C. and −10° C. and maintained at that temperature for 72 hours. The material was then thawed at room temperature in the course of 24 hours. Comparison with an untreated pigment paste immediately after thawing, after 7 days and after 28 days showed that the treated pigment pastes have only a slightly increased viscosity as compared with an untreated pigment paste.

EXAMPLE 3

Preparation of Water-based Lacquers 3.1. Preparation of a Black Water-based Lacquer The following constituents were mixed together thoroughly, with stirring:
- 15.07 wt. % of a polyurethane dispersion according to DE-A-196 43 802, Preparation Example 1, polyurethane dispersion A)
- 17.84 wt. % of a polyurethane dispersion according to DE-A-196 43 802, Preparation Example 2, polyurethane dispersion B)
- 22.80 wt. % of black paste according to Example 2.1.
- 29.30 wt. % of dem. water
- 5.45 wt. % of butoxyethanol
- 2.20 wt. % of Shellsol® T
- 5.71 wt. % of commercial acrylate thickener (10% aqueous solution)
- 1.63 wt. % of 10% dimethylethanolamine solution 3.2. Preparation of a White Water-based Lacquer The following constituents were mixed together thoroughly, with stirring:
- 15.05 wt. % of a polyurethane dispersion according to DE-A-196 43 802, Preparation Example 1, polyurethane dispersion A)
- 17.81 wt. % of a polyurethane dispersion according to DE-A-196 43 802, Preparation Example 2, polyurethane dispersion B)
- 29.40 wt. % of white paste according to Example 2.2.
- 24.95 wt. % of DM water
- 5.45 wt. % of butoxyethanol
- 5.71 wt. % of commercial acrylate thickener (10% aqueous solution)
- 1.63 wt. % of 10% dimethylethanolamine solution 3.3. Preparation of a Metallic Water-based Lacquer The following constituents were mixed together thoroughly, with stirring:
- 19.56 wt. % of a polyurethane dispersion according to DE-A-196 43 802, Preparation Example 1, polyurethane dispersion A)

23.15 wt. % of a polyurethane dispersion according to DE-A-196 43 802, Preparation Example 2, polyurethane dispersion B)

10.00 wt. % of bronze paste according to Example 2.3.

32.92 wt. % of dem. water 3.83 wt. % of butoxyethanol 1.00 wt. % of n-butanol 7.42 wt. % of commercial acrylate thickener (10% aqueous solution)

2.12 wt. % of 10% dimethylethanolamine solution 3.4. Preparation of an Iriodine Water-based Lacquer The following constituents were mixed together thoroughly, with stirring:

15.96 wt. % of a polyurethane dispersion according to DE-A-196 43 802, Preparation Example 1, polyurethane dispersion A)

18.89 wt. % of a polyurethane dispersion according to DE-A-196 43 802, Preparation Example 2, polyurethane dispersion B)

25.00 wt. % of iriodine paste according to Example 2.4.

28.24 wt. % of dem. water 3.13 wt. % of butoxyethanol 1.00 wt. % of n-butanol 6.05 wt. % of commercial acrylate thickener (10% aqueous solution)

1.73 wt. % of 10% dimethylethanolamine solution

The water-based lacquers so obtained are stable to storage over a period of at least 36 months.

Shortly before application, a commercial polyisocyanate crosslinking agent based on HDI trimer was in each case added in such an amount that the ratio of equivalents of hydroxyl groups to isocyanate groups was 1:1.

The water-based lacquers were applied to metal substrates pre-coated with conventional primer and filler layers, were over-lacquered, after being exposed to air for a short time, with solvent-based 2K clear lacquers (based on polyhydroxy acrylate resin/polyisocyanate) and were hardened for 30 minutes at 60° C. The resulting coatings exhibit very good hardness and resistance to chemicals, good covering power, and the metallic lacquer coatings exhibit a very good metallic effect, a high degree of brightness and good adhesion to the substrate.

What is claimed is:

1. A water-dilutable binder composition comprising
    A) at least one water-dilutable hydroxy-functional polyurethane urea resin having a urea group content (calculated as —NHCONH—) of 10 to 300 mmol in 100 g of solid resin, a urethane group content (calculated as —NHCOO—) of 20 to 300 mmol in 100 g of solid resin, an OH number of 20 to 250 and a number average molar mass Mn of 1000 to 20,000 g/mol; and
    B) 2.0 to 25 wt. % of at least one polyether polyol having a molar mass of 400 to 5000 g/mol, said wt. % of the polyether polyol being based on the solids content of the polyurethane urea resin used;
    wherein the polyurethane urea resin of A) is formed by the following steps:
    I) preparing an NCO-group-containing polyurethane prepolymer by reacting:
        a1) at least one hydroxy-functional compound having a number-average molar mass Mn of 360 to 8000 g/mol;
        a2) at least one polyisocyanate; and
        a3) at least one compound having at least one group that reacts with isocyanate and at least one group that is ionic or capable of forming ions;
    II) reacting the NCO-group-containing polyurethane prepolymer prepared in step I with
        a4) at least one hydroxy-functional monamine and optionally with at least one polyol, in such relative amounts that the resulting polyurethane urea resin has the said hydroxyl numbers and said urea and urethane group content;
    III) neutralizing at least some of the ionic groups or groups that can be converted into ionic groups of the resulting polyurethane before or after the reaction in step II, and transferring the resulting reaction product into the aqueous phase.

2. A water-dilutable binder composition according to claim 1, wherein the water-dilutable hyroxy-functional polyurethane urea resin has a urea group content (calculated as —NHCONH—) of 20 to 250 mmol in 100 g of solid resin, a urethane group content (calculated as —NHCOO—) of 80 to 250 mmol in 100 g of solid resin, an OH number of 40 to 200, an acid number of 15 to 80 and a number-average molar mass Mn of 1500 to 15,000 g/mol.

3. A water-dilutable binder composition according to claim 1, wherein the hydroxy-functional compound of a1) is a linear or branched compound having an OH functionality of 2 to 3, an OH number of 50 to 250 and a number-average molar mass Mn of 360 to 8000 g/mol.

4. A water-dilutable binder composition according to claim 1, wherein the hydroxy-functional compound of a1) is selected from the group consisting of polyester polyols, polyether polyols, polycarbonate polyols, polylactone polyols and poly(meth)acrylate polyols.

5. A pigment paste comprising at least one paste resin, at least one pigment, and optionally at least one liquid component selected from the group consisting of water, organic solvents, and customary lacquer additives, said paste resin comprising the water-dilutable binder composition of claim 1, wherein the pigment to binder weight ratio is 0:3 to 20:1.

6. An aqueous coating composition comprising a lacquering-up binder, a pigment paste according to claim 5 and optionally at least one crosslinking agent, water, at least one organic solvent, and at least one customary lacquer additive.

7. The aqueous coating composition of claim 6, wherein the lacquering-up binder is comprised of a water-dilutable binder composition according to claim 1.

8. A color and effect-providing base lacquer layer in a multi-layered lacquer, wherein said color and effect-providing base lacquer layer is comprised of a pigment paste according to claim 5.

9. A pigmented single-layer finishing lacquer in a multi-layered lacquer, wherein said single-layer finishing lacquer is comprised of a pigment paste according to claim 5.

10. A substrate coated with a color and effect-providing base lacquer layer according to claim 8.

11. A substrate coated with a pigmented single-layer finishing lacquer according to claim 9.

12. The substrate according to claim 10, wherein the substrate is a motor vehicle or part thereof.

13. The substrate according to claim 11, wherein the substrate is a motor vehicle or part thereof.

* * * * *